United States Patent [19]
Kunz et al.

[11] Patent Number: 5,387,449
[45] Date of Patent: Feb. 7, 1995

[54] COMPOSITES OF PLASTIC FILMS AND PACKAGING MADE THEREOF

[75] Inventors: Peter Kunz, Kreuzlingen, Switzerland; Joachim Roncoroni, Radolfzell; Andreas Rothschink, Konstanz, both of Germany

[73] Assignee: Alusuisse-Lonza Services Ltd., Zurich, Switzerland

[21] Appl. No.: 60,800

[22] Filed: May 12, 1993

[30] Foreign Application Priority Data

May 22, 1992 [CH] Switzerland ............... 1661/92

[51] Int. Cl.$^6$ ............ B32B 1/08; B32B 7/00; B32B 15/08; B32B 27/06
[52] U.S. Cl. ............... 428/35.4; 428/35.2; 428/35.7; 428/36.6; 428/36.7; 428/36.9; 428/215; 428/216; 428/219; 428/220; 428/448; 428/469; 428/480; 428/483
[58] Field of Search ............... 428/446, 448, 451, 480, 428/483, 500, 515, 469, 35.2, 35.4, 35.7, 36.6, 36.7, 36.9, 215, 216, 220, 219

[56] References Cited

U.S. PATENT DOCUMENTS

| | | | |
|---|---|---|---|
| 3,442,686 | 5/1969 | Jones | 117/70 |
| 4,528,234 | 7/1985 | Kaino et al. | 428/216 |
| 4,552,791 | 11/1985 | Hahn | 428/35 |
| 4,702,963 | 10/1987 | Phillips et al. | 428/426 |
| 4,912,103 | 3/1990 | Sibbach et al. | 428/215 |
| 5,085,904 | 2/1992 | Deak et al. | 428/35.7 |
| 5,100,720 | 3/1992 | Sawada et al. | 428/215 |
| 5,112,673 | 5/1992 | Sawada et al. | 428/216 |
| 5,151,317 | 9/1992 | Bothe | 428/216 |
| 5,223,346 | 6/1993 | Lu | 428/516 |

FOREIGN PATENT DOCUMENTS

| | | |
|---|---|---|
| 0240571 | 10/1987 | European Pat. Off. . |
| 0312333 | 4/1989 | European Pat. Off. . |
| 3300411 | 7/1983 | Germany . |

*Primary Examiner*—D. S. Nakarani
*Assistant Examiner*—Vivian Chen
*Attorney, Agent, or Firm*—Bachman & LaPointe

[57] ABSTRACT

The invention relates to composites of plastic films and packaging forms made thereof that feature a permeability barrier layer, said forms of packaging being made from a composite featuring, from outside to inside, for example the layers $a_o$) a polyester film of thickness 6 to 23 $\mu$m,
b) a ceramic layer of thickness 10 to 500 $\mu$m, for example of the general formula $SiO_x$,
a) a polyester film of thickness 6 to 23 $\mu$m, if desired with a further ceramic layer b) and
c) a polyolefin film of thickness 15 to 200 $\mu$m.

The invention relates also to the use of the packaging forms e.g. pouch, net, or self-standing pouch forms for foodstuffs, foodstuff preparations semi-luxury consumables and semi-luxury consumable preparations.

14 Claims, No Drawings

COMPOSITES OF PLASTIC FILMS AND PACKAGING MADE THEREOF

BACKGROUND OF THE INVENTION

The present invention relates to composites of plastic films containing a barrier layer against permeability, and also relates to the use of said composites for the manufacture of packaging forms.

To be understood as packaging forms here are in particular pouches such as sealed seam pouches, tube shaped pouches, salt-standing pounces, sachets, sacks, bags, and wraps for example for foodstuffs and foodstuff preparations.

For example, products of the foodstuff and semi-luxury consumables industry that perish easily or otherwise exibit impaired quality during storage, must be protected by means of suitable packaging materials from external influences such as foreign aromas, odors, moisture, penetration of oxygen, microbial effects, and from loss of substances to the outside. This protection can be achieved by incorporating barrier layers or barrier layers against permeability in the packaging material, for example, aluminum foil, EVOH or PVDC.

The disadvantage of aluminum foil is the large mount of energy required for its primary manufacture and its influence on the purity requirement for recycling packaging materials. EVOH is sensitive to moisture and gives rise to difficulties during manufacture; PVDC. as with all chlorine-containing plastics, is undesirable from the environmental standpoint.

For flexible packaging purposes, e.g. for pouches, considerable use is made today of composites in the form of laminates comprising different kinds of tightly-bonded films, foils and/or other layers, such as e.g. adhesives or barrier layers. The aim is to usefully combine the properties of the individual components. One important aspect of using such packaging is the resistance to conservation processes that as a rule take the form of thermal treatments such as pasteurization, sterilization, or aeseptic treatments.

Known for example from EP-A 0 240 571 are pouches of polyester (25 μm)/silicon oxide (600 Å)/cast polypropylene (70 μm) that are intended for containing cooked and processed foodstuffs. Long-term storage tests show that pouches made from such composites, do not provide convincing results with respect to the shelf-life of their contents.

SUMMARY OF THE INVENTION

The object of the present invention is to provide composites of plastic films and packaging forms made from these composites, that protect their contents from external influences and against loss of components, having waste material comprising essentially only plastics, said packaging being resistant to the influence of thermal, radiation, and chemical treatments empolyed for food conservation such as e.g. sterilization and pasteurization processes, cooking conditions and aeseptic treatment.

This objective is achieved by way of the invention in that the said composites feature, from outside to inside, the layers $a_o$) a polyester film of thickness 6 to 23 μm,
a) a polyester film of thickness 6 to 23 μm and
c) a polyolefin film of thickness 15 to 200 μm or
a) a polyolefin film of thickness 15 to 50 μm and
c) a polyolefin film of thickness 15 to 200 μm
whereby at least one ceramic layer b) of thickness 10 to 500 nm is provided between the layers $a_o$) and a) and/or a) and c), or a) and c).

DETAILED DESCRIPTION OF PREFERRED EMBODIMENTS

Useful are composites of plastic films according to the present invention, that feature the layers
$a_o$) a polyester film of thickness 6 to 23 μm,
a) a polyester film of thickness 6 to 23 μm,
c) a polyolefin film of thickness 20 to 200 μm,
whereby at least one ceramic layer of thickness 10 to 500 nm is provided between the layers $a_o$) and a), and usefully at least one ceramic layer b) of thickness, 10 to 500 nm can be provided between the layers a) and c).

Useful are composites of plastic films that feature, from outside to inside, the layers
$a_o$) a polyester film of thickness 6 to 23 μm,
a) a polyester film of thickness 6 to 23 μm,
c) a polyolefin film of thickness 20 to 200 μm,
whereby at least one and in particular a ceramic layer b) of thickness 10 to 500 nm is provided between the layers $a_o$) and a).

Useful are composites of plastic films according to the present invention that feature from, outside to inside, the layers
a) a polyolefin film and in particular a cast polypropylene film (cPP) or oriented polypropylene film (OPP) of thickness 15 to 50 μm and
c) a polypropylene film of thickness 20 to 200 μm,
whereby at least one ceramic film b) of thickness 10 to 500 nm is provided between the layers a) and c).

Useful are composites of plastic films according to the present invention that feature, from outside to inside, the layers
a) a polyolefin film and in particular a cast polpropylene film (cPP) or oriented polypropylene film (OPP) of thickness 15 to 50 μm and
c) a polyethylene film of thickness 20 to 200 μm,
whereby at least one ceramic layer b) of thickness 10 to 500 nm is provided between the layers a) and c).

Useful are composites of plastic films according to the present invention that feature, from outside to inside, the layers
a) a biaxial oriented polypropylene film of thickness 15 to 50 μm and
c) a polypropylene film of thickness 20 to 200 1μm
whereby at least one ceramic layer b)of thickness 10 to 500 nm is provided between the layers a) and c).

Useful are composites of plastic films according to the present invention that feature, from outside, to inside the layers
a) a biaxial oriented polypropylene film of thickness 15 to 50 μm and
c) a biaxial oriented polypropylene film of thickness 15 to 50 μm,
whereby at least one ceramic layer b) of thickness 10 to 500 nm is provided between the layers a) and c).

The designation "outside" refers to the side of the composite that in the form of packaging lies on the outside; the designation "inside" refers to the side of the composite that faces the interior of the packaging.

The ceramic layer b) can be deposited on the layers a), $a_o$) or c), that thereby serve as supporting material or substrate. Depending on whether the ceramic layer is deposited on one side of the layers ao) or c), or on one or both sides of layer a), use is made of one, two, three or four ceramic layers. Preferred is one layer b) in a composite of plastic films.

The composites of plastic films employed feature accordingly plastic films that contain or are thermoplastics of the polyolefin and polyester series. The plastic films of that type can contain the usual agents such as e.g. softeners, antioxidants, lightguarding agents, filler materials, lubricants, e.g. eroca-acid-amide, emulsifiers, pigments, e.g. $TiO_2$, optical lighteners or antistatic agents. The regulations governing foodstuffs are to be observed on selecting all substances.

The plastic films can be non-stretched or unixially or biaxially stretched, according to the case in question.

Examples of polyolefins are polyethylene, e.g. high density polyethylene (HDPE, density greater than 0.944 g/cm$^3$), medium density polyethylene (MDPE, density 0.926–0.940 g/cm$^3$), linear medium density polyethylene (LMDPE, density 0.926–0.940 g/cm$^3$), low density polyethylene (LDPE, density 0.910–0.925 g/cm$^3$) and linear low density polyethylene (LLDPE, density 0.916–0.925 g/cm$^3$), or mixtures thereof, polypropylenes, amorphous or crystalline proproylenes, atactic or isotactic proproylenes or mixtures of these proproylenes, axial or biaxial oriented propylene or cast proproylene, poly-1-butene, poly-3-methylbutene, poly-4-methylpentene and copolymers thereof, such as e.g. of polyethylene with vinyl-acetate, vinyl-alcohol, acrylic acid, e.g. ionomer resins, such as copolymers of ethylene with about 11% acrylic acid, methacrylic acid, acrylic esters. tetrafluorethylene or polypropylene, and statistical copolymers, block-copolymers or olefin-polymer-elastomer mixtures.

Thermoplastics from the ester series are for example, polyalkylene terephthalate or polyalkylene isophthalate with alkylene groups or radicals with 2 to 10 carbon atoms or alkylene groups with 2 to 10 C-atoms that are interrupted by at least one -O-, such as e.g. polyethylene terephthalate, polypropylene terphthalate, polybutylene terephthalate (polytetramethylene terephthalate), polydecamethylene terephthalate, poly-1.4-cyclo-hexyl-dimethylol terephthalate or poly-ethylene-2,6-naphthalene-dicarboxylate or polyalkylene terephthalate and polyalkylene isophthalate mixed polymers, whereby the fraction of isophthalate e.g. amounts to 1–10 mol %, mixed polymers and terpolymers, as well as block polymers and grafted modifications of the above mentioned substances.

Other thermoplastics on an ester basis are copolymers of terephthalic acid and a further polycarboxylic acid with at least one glycol. Usefully, also present are the copolymers of terephthalic acid, ethylene glycol and an additional glycol. Such glycol modified polyesters are known in the field as PETG.

Thermoplastics on an ester basis are, usefully, polyalkylene terephthalates with alkylene groups or radicals with 2 to 10 carbon atoms and polyalkylene terephthalates with alkylene groups or radicals with 2 to 10 carbon atoms that are interrupted by one or two -O-.

Preferred ester-based thermoplastics are polyalkylene terephthalates with alkylene groups or radicals with 2 to 4 carbon atoms, and especially strongly preferred are polyethylene terephthalates. Belonging to these polyethylene terephthalates are also A-PET, PETP and the above mentioned PETG or G-PET. PETP is very specially preferred.

With the above mentioned groups of substances can also be included e.g. polymer mixtures or mixed, block, or grafted polymers or also copolymers.

The plastic films i.e. in particular the polyester films and polyolefin films, can themselves be in the form of monofilms, however also as composites of two or more films, whereby the group of substances making up the films can essentially always be the same.

The plastic films can be flame-treated, corona-treated or plasma-treated and/or coated on one or both sides and/or coextruded.

The plastic films can be transparent, translucent, cloudy, opaque, coloured or contain color pigment.

The thickness of each of the two layers a) and $a_o$), accordingly the outer lying polyester films, is usefully 8 to 20 um preferably 10 to 15 $\mu$m. or the single layer a) in the form of the outer-lying polyolefin film is usefully 15 to 40 $\mu$m, preferably 15 to 35 $\mu$m.

The thickness of the layer c), accordingly the inner lying polyolefin film, is advantageously 15 to 200 $\mu$m, particularly advantageously from 20 to 200 $\mu$m, preferably from 50 to 150 $\mu$m and preferably from 80 to 150 $\mu$m.

As permeability barrier layer, permeability barrier, barrier or barrier layer according to the present invention, use is made of ceramic layers, of oxides and/or nitrides of metals and/or semi-metals, created by vacuum thin-layer evaporation.

The ceramic layer is usefully deposited by a vacuum thin-layer process, whereby physical coating processes (PDV) or chemical coating processes (CVD) with plasma assistance can be brought into use. Preferred are physical coating processes, in particular such on the basis of electron beam vaporisation or resistance heating or inductive heating from crucibles. Particularly preferred is electron beam vaporization. The described processes can be carried out reactively and/or with the assistance of ionization.

For the ceramic layer one can employ the oxides and/or nitrides of metals and/or semi-metals, e.g. those of silicon, aluminum, iron, nickel, chromium, tantalum, molybdenum, magnesium, lead or mixtures thereof. Embraced therefore are also the oxi-nitrides of the above mentioned metals or semi-metals.

The ceramic layer can contain, apart from the above mentioned oxides, also the corresponding metals, at least in smaller quantities.

The silicon oxides or aluminum oxides are useful as ceramic layers. The silicon oxides can have the general formula $SiO_x$, where x is usefully a number from 1 to 2, preferably 1.1 to 1.9 and in particular from 1.1 to 1.7. The aluminum oxides can have the formula $Al_yO_z$, where y/z is e.g. a number of 0.2 to 1.5, preferably from 0.65 to 0.85.

By way of example the ceramic layer has a thickness of 5 to 500 nm, advantageously from 10 to 200 nm, preferably from 40 to 150 nm.

Usefully, the quantity of oxides and/or nitrides of metals and/or semimetals in the ceramic layer amounts to 50 to 400 mg/m$^2$ of plastic film, preferably 100 to 150 mg/m$^2$ of plastic film and in particular 110 to 130 mg/m$^2$ plastic film.

Particularly preferred are permeability barrier layers in the form of a 10 to 500 nm thick ceramic layer of a silicon oxide with the general formula $SiO_x$, where x is a number of 1.1 to 1.7 or an aluminum oxide of the general formula $Al_yO_z$, where y/z represents a number of 0.2 to 1.5.

The permeability barrier layer in the form of a ceramic layer is in practice deposited on at least one side of at least one plastic film by means of one of the above mentioned processes. The plastic film serves accordingly as a substrate or carrier on which the ceramic layer is deposited.

The thickness and number of ceramic layers can be selected according to the requirements made of the blocking or barrier effect to be exercised on the permeability.

For example a plastic film can be coated on one side with a ceramic layer and the other plastic film laminated with the first, placing it onto the ceramic layer.

A further possibility is for two plastic films, each coated on one side with a ceramic layer, to be joined with the coated sides facing each other.

Another version is to coat a plastic film on both sides and to deposit on the ceramic layers uncoated plastic films or plastic films that are coated on only one side. In the last mentioned case it is advantageous to have an arrangement of ceramic layer facing ceramic layer.

In practice, advantageous composites of plastic films according to the invention are those whose plastic films feature polyesters, in particular PETP or polyolefins and especially polypropylene or comprise of the same, and have a permeability barrier layer on the polyester film or the polypropylene film or on both polyester films, and in particular the polyester and polylofin layers with the ceramic layers in between are bonded together into a laminate.

Further composites of plastic films according to the invention that are advantageous in practice are those featuring or comprising plastic films $a_o$) and a) of polyethylene terephthalates and in particular PETP and a permeability barrier layer on one of the polyethyleneterephthalate films or both polyethylene terephthalate films. The said barrier layer can e.g. be on one of the a) layers, which in turn is laminated onto the $a_o$) layer.

The permeability barrier layer can be situated on the polyolefin film c) on the side bonded to the polyester film a) or polyolefin film a) and/or on the polyester film a) or polyolefin film a) on the side bonded to the polyolefin film c).

Usefully, the plastic films are bonded together by a bonding agent or adhesive and such that the side of one film bearing the permability barrier layer is bonded to the other film or the permeability barrier layers on each film are bonded together.

Possible bonding agents between plastic films, between the plastic films and the ceramic layers or between the ceramic layers are for example vinylchloride copolymers, polymerizable polyesters, vinylpyridine-polymerides, vinylpyridine polymerides combined with epoxy resins, butadiene-arylnitrile methacrylic-acid copolymers, phenolic resins, rubber derivatives, acrylic resins, acrylic resins with phenolic or epoxide resins, organic silicon compounds such as organosilanes, modified polyolefins, acid modified polyolefins or ethylene-acrylic acid (EAA).

Preferred are EAA (ethylene-acrylic acid) or modified polyolefins such as e.g. modified polypropylenes.

A preferred modified polypropylene is an adduct from maleic-acid-anhydride and an ethylene-propylene copolymer. Especially preferred are dispersions of modified polyolefins. One example of a dispersion of a modified polypropylene is Morprime (trade name of the company Morton International of Norton Norwich Products, Inc.).

Further suitable bonding agents are adhesives such as nitril-caoutchoucphenolic resins, epoxides, acrylonitrile-butadiene-caoutchouc, urethene-modified acrylics, polyester-copolymers, hot melting polyesters, polyisocyanates cross-linked with hot-melting polyesters, polyisobutylene-modified styrol-butadiene-caoutchoucs, urethanes, ethylene-acrylic acid mixed polymers, and ethylene-vinylacetate mixed polymers.

If laminate adhesives are employed as bonding agent, then the laminate adhesives can contain solvents, be solvent-free, or water-containing. Examples are solvent-containing, solvent-free or aqueous acrylate adhesives, or polyurethane adhesives (1 or 2 component PU adhesives), or epoxy resin adhesives.

Preferred are layers in the form of films of the composites according to the present invention laminated together by means of an adhesive.

Preferred are laminate adhesives based on polyurethane and especially two-component polyurethane adhesives.

The bonding agent can for example be employed in amounts of 0.1 to 10 $g/m^2$, usefully in amounts of 0.8 to 6 $g/m^2$ and in particular in amounts of 2–6 $g/m^2$.

The laminate adhesive can for example be employed in amounts of 1 to 10 $g/m^2$, preferably in amounts of 2 to 8 $g/m^2$ and in particular in amounts of 3 to 6 $g/m^2$.

In order to assist and improve the adhesion the bonding agent and laminate adhesive achieve between the layers or plastic films, it is often useful to endow the bonding agent layer on the side facing the adhesive with an adequate surface tension. The increase in surface tension can be achieved advantageously by way of pretreatment with a flame, by plasma or corona treatment.

The lamination of the individual layers or plastic films can be performed for example by hot calandering, adhesive bonding, extrusion coating, coextrusion coating or extrusion lamination, whereby adhesive lamination is preferred.

Preferred by way of the present invention are composites of plastic films and packaging forms therefrom, that feature, from outside to inside, the following layers:

$a_o$) a PET-P film of thickness 10 to 15 $\mu$m, especially 12 $\mu$m, b) an $SiO_x$ layer on film a), where x stands for 1.1 to 1.7, and said layer is deposited on layer a) as carder film by means of a vacuum thin layer deposition process, a) a PET-P film of thickness 10 to 15 $\mu$m, especially 12 $\mu$m, c) a polypropylene film of thickness 50 to 100 $\mu$m, especially 75 $\mu$m, or an 80 to 120 $\mu$m thick film of medium and/or low density polyethylene, whereby a lamination adhesive is present between the layers $a_o$) and a). and between b) and c);

or a) a foil of biaxially stretched polypropylene, 15 to 35 $\mu$m thick, b) an $SiO_x$ layer deposited on film a), where x stands for 1.1 to 1.7 and said $SiO_x$ layer deposited by a vacuum thin layer process onto layer a) that serves as carrier film, c) a polypropylene film, 50 to 100 $\mu$m thick, preferably 75 $\mu$m, where a laminate form of adhesive is present bewteen the layers b) and c) and—as another version—layer b) can be deposited on c) and the laminate adhesive can be provided between layers a) and b).

The composites of plastic films are particularly suitable as packaging materials; the resultant packaging forms exhibit a high barrier function towards chemical, physical or microbial attack and protect the packaged goods from e.g. oxidation, radiation or degradation. In particular, the barrier properties with regard to air, oxygen and water vapor, humidity, aromas and foreign odors are excellent.

The composites of plastic films according to the invention usefully exhibit barrier-to-oxygen values of, as measured in accordance with ASTM D 3985-81, at 25 deg. C. and 50% rel. humidity, in the untreated condition, $<1.8$, usefully $<0.6$, particularly usefully $<0.5$, advantageously $<0.3$ cm$^3$/(m$^2 \cdot$d$\cdot$bar) and after a pasteurization or sterilization treatment $<2.0$ cm$^3$/(m$^2 \cdot$d$\cdot$bar), advantageously $<0.8$ cm$^3$/(m$^2 \cdot$d$\cdot$bar).

Packaging made from the composites according to the invention, in particular pouches and self-standing pouches according to the present invention usefully exibit barrier to oxygen values of, as measured in accordance with ASTM D 3985-81, at 25 deg. C. and 50% rel. humidity, in the untreated condition $<0.75$, advantageously $<0.5$ cm$^3$/(pack$\cdot$d), and after a pasteurization or sterilization treatment $<2.0$, advantageously $<0.75$ cm$^3$/(pack$\cdot$d).

The composites of plastic foils according to the present invention usefully exhibit barrier to water vapor values of, as measured in accordance with ASTM F 372-78 at 25 deg. C. and 90% relative humidity, in the untreated condition, $<0.6$, advantageously $<0.4$, preferred $<0.1$ g/(m$^2 \cdot$d) and, after a pasteurization or sterilization treatment $<1.0$ g/(m$^2 \cdot$d), advantageously $<0.9$ g/(m$^2 \cdot$d).

Packaging, in particular pouches and self-standing pouches, according to the present invention, usefully exhibit barrier to water vapor values of $<0.1$ g/(pack$\cdot$d), advantageously $<0.05$ g/(pack$\cdot$d) as determined in accordance with ASTM F 372-78, at 25 deg. C. and 90% relative humidity, in the untreated condition and after a pasteurization or sterilization treatment.

In order to extend its range of properties, in particular as packaging material, the composite of plastic films according to the invention can be overlaid with one or more plastic layers such as e.g. plastic films, by means of laminate coating e.g. with solvent-containing or solvent-free adhesives, or water-based adhesive systems, by extrusion lamination, or by extrusion coating. Also possible is the application of one or more layers to the composites on one or both sides e.g. using a sealant coating or sealing paint.

This way e.g. one or both outer sides of a composite according to the present invention can be made partially or wholly heat or cold sealable in order to subsequently manufacture out of it packaging material for tightly sealable, flexible or semi-rigid packaging. This packaging material can be be printed on by various methods (photogravure, flexo-printing or offset printing), this either on the outside of the first film or in reverse image on the inner side. Furthermore, in order to protect a printed image, a protective layer such as e.g. a heat resistant paint or release paint can be deposited on the outside.

Also possible is to apply to the outer side of the composite a layer of paper, cardboard or other cellulose types of material. These materials can also be colored or printed on.

The packaging material made from the composites according to the present invention, can e.g. be processed on conventional packaging machines into flexible or semi-rigid forms of packaging such as e.g. sealed-seam pouches, tube-shaped pouches, self-standing pouches, sachets, wraps, sacks, bags etc. Sealing by means of cold, hot, induction or ultrasonic means or by welding or adhesive bonding, makes it possible to produce seams and thus packaging, and such that the said forms of packaging are tightly sealed.

In order to manufacture e.g. pouches or self-standing pouches, the composites according to the invention are shaped into pouch form via seams at the edges made for example by sealing, welding, ultrasonic sealing or ultrasonic welding or adhesive bonding, if desired or necessary by incorporation of a base part. Preferred is sealing, in particular contact heat-sealing. The strength of the seams is influenced by the geometry of the seal, the sealing temperature, the sealing pressure, and the duration of sealing. If the seams are made by ultrasonic means the appropriate necessary energy parameters must be observed.

The pouch and self-standing pouch according to the present invention feature seams on the base, top and sides that are e.g. highly resistant to separation i.e. permanent.

The packaging forms according to the present invention can feature two joints, in particular sealed seams, of different strength. In the region of the base parts and the side seams use is made e.g. of a joint that is permanent i.e. highly resistant to separation, in particular permanent sealing; the seam at the top of the pouch and, if desired, a seam that automatically relieves positive pressure and is, usefully, easily pulled open.

Typical rupture forces for separating permanent seams, or for rupturing the pouch beside said seams, are greater than 30 N/15 mm. Typical forces required to open the easy-to-open top seam are 5 to 20 N/15 mm.

The rupture forces for seams can, in the case of sealed seams, be influenced via the geometry of the sealing tool, the sealing pressure, the temperature and/or duration of sealing or correspondingly via the amount of energy applied during ultrasonic welding or sealing.

Usefully, the sealed seams are made using tools with rounded edges. Sealed joints made with such tools exhibit higher strength than those that have been made with sharp edged tools. The latter type of seam can give rise to a notch effect. This can, however, be employed to provide sealed joints with tear-open strips.

The sealing pressure depends on the material and on the thickness of the plastic foil, and is typically 1 to 10 kg/cm$^2$ of sealed surface.

The sealing temperature is likewise dependent on material and thickness, and can be from 120 deg. C. to 250 deg. C.

Sealing is preferably controlled via temperature and/or time.

Temperatures of 200 deg. C. to 250 deg. C. are preferred for permanent joints. For difficult-to-open joints temperatures of e.g. 180 deg. to 200 deg. C. are employed. For easy-to-open joints temperatures of e.g. 170 deg. C. to 190 deg. C. are employed.

The sealing time can in practice amount to 0.1 to 3 seconds; preferred is a sealing time of 0.6 to 1 sec. for permanent joints, 0.4 to 0.8 sec. for difficult-to-open joints and 0.5 to 0.6 sec. for easy-to-open joints.

The sealed seams can be arranged e.g. such that a self-standing pouch is produced. For that purpose, the side seams and if necessary base seams are sealed, said seams being made e.g. by joining a front side and a back side of a folded plastic film composite or by joining up a pair of plastic film composites. In the region of the base of the pouch sealed seams can be provided starting from the side seams and running outwards, from above outwards inclined, from below inwards towards the seams at the base. As a result the pouch gains stability and rigidity.

The seam at the top and, if provided, a self-actuating means for relieving positive pressure, can be sealed such that they are at least partially easy-to-open and subsequently form at least one easy-open pouch seam at the top or a means for automatic pressure relief.

The seam at the top can feature an aid for tearing it open, this in the form of a notch in the seam. The pressure release means can take the form of a recess in the packaging surrounded by a sealed seam or a notch pointing inwards.

For example on packaging moisture-containing goods e.g. foodstuffs, the pouch can be filled, sealed and pasteurised or sterilised, if necessary under counterpressure. Before use or consumption of the contents, the pouch contents can be reheated in the pouch, preferably in a water bath or by microwave treatment. On reaching a predetermined pressure inside the pouch, for example due to build-up of vapor, the pressure can be relieved by the self-actuating facility in the region of the top of the pouch opening automatically. The automatic pressure relief can also take place via an opening aid in the form of a notched sealed joint that is created between pouch walls and is directed towards the interior of the pouch.

After the pouch contents have been heated as required, the seam at the top of the pouch can be opened along the seam or along an easy-open seam. The pouch can then be opened sufficiently wide to enable the contents to be removed with ease. The easy opening of the seam at the top of the pouch can be simplified by provision of a tear-open aid at that seam.

The present invention relates also to the use of the packaging according to the invention for the containment of various goods.

The packaging varients are suitable e.g. for containment of goods from the foodstuffs industry, in particular for containment of foodstuffs and semi-luxury consumables. The foodstuffs can be put into the packaging hot, warm or cold, in raw form, or prepared for consumption. After filling and before or especially after closing or sealing on the packaging lid, the packaging can be subjected to a conservation treatment e.g. pasteurisation or sterilisation, e.g. in the range of standard treatment conditions at 80 to 130 deg. C., in particular 85 deg. C. to 95 deg. C., or 110 to 125 deg. C. for a duration of 30 sec. to 6 hours.

The filled container can be stored at room temperature, cooled or deep-frozen and reheated prior to consumption or heated to boiling e.g. in a water bath or microwave oven.

The present invention relates also to the use of the composites of plastic films for manufacture of packaging forms and in particular pouch, flat pouch, tube-type pouch or self-standing pouch forms, sachets, and wraps, e.g. for packaging goods from the foodstuffs and semi-luxury consumables field. Contents coming into question are mainly foodstuffs and foodstuff preparations such as meat and fish dishes, chocolates, soups, sauces, granulates, flakes and semi-luxury consumables such as e.g. mixed drinks, milk-containing drinks, fruit juices and fruit juice preparations. Such foodstuffs and semi-luxury consumables can be in fluid, paste, solid form or mixtures thereof. Foodstuff preparations can likewise be in fluid, pasty, gelatinous,solid or semi-solid form or as mixtures therof. Furthermore, the foodstuffs and foodstuff ingredients can be filled into the packaging according to the invention in the raw, partially cooked or cooked form. The packaging can be subjected to a conservation treatment. For example the packaging can be aseptic or rendered aeseptic for example by pasteurizing or sterilizing. Other methods, such as chemical methods using conserving agents, or aseptic treatment via radiation or peroxides are likewise possible. In practice the goods to be packaged are put into the pouch at the one end that is open, the opening closed tightly e.g. by sealing and the filled, closed pouch subjected to conservation treatment conditions e.g. pasteurization conditions such as e.g. 0.5 to 6 hours, usefully for example 1 to 4 hours heated to 80 to 115 deg. C., preferred is 85 to 95 deg. C. It is also possible to render the contents e.g. fruit juices aseptic by heat treatment and then to fill them hot into the packaging according to the invention (so called hot filling). The sterilisation conditions are 110 to 130 deg. C., usefully 12 1 deg. C., for 20 to 60 min. in particular 30 min. Such forms of treated packaging , especially pouches can then be stored for long times.

The preparation of the contents, in particular reheating them can be performed by exposing the filled, closed pouch to a water bath or, if preferred, to microwave treatment. With increasing heat and heating up of the contents the volume increases e.g. due to the formation of water vapour. If intended, the pressure can be released automatically,when a given pressure is reached in the interior, e.g. 4 to 10 Pa. After the reheating process has been concluded, a part or the whole of the top seal on the pouch can be opened e.g. by hand. Means can be provided to assist with the tearing open of the seam, for example flaps to grip on. Also, after the pasteurisation process, storage and reheating, which can for example last up to 3 hours, there is no delamination of the composite and the sealed seams of the packaging do not come free unintentionally.

Forms of packaging, in particular pouches according to the invention can feature contents of, for example, 0.2 liters to 10 liters, whereby contents of 0.25 to 5 liters are preferred and contents of 0.25 to 3 liters are especially preferred. The outer dimensions can be of 5 cm edge length to 60 cm edge length with respect to height and breadth, whereby edge lengths of 10 to 30 cm are preferred.

We claim:

1. Composites of plastic films, including a permeability barrier layer, in which said composites comprise
   $a_o$) a polyester film of thickness 6 to 23 $\mu$m,
   a) a polyester film of thickness 6 to 23 $\mu$m,
   c) a polyolefin film of thickness 15 to 200 $\mu$m, wherein one ceramic layer b) selected from the group consisting of silicon oxide having the formula $SiO_x$, where x is a number from 1.1 to 1.9 and aluminum oxide having the formula $AlyOz$ wherein y/z is a number from 0.2 to 1.5 of thickness 10 to 500 nm, is provided between the layers $a_o$) and a) .

2. Composites of plastic films according to claim 1 wherein the polyolefin film c) is a polypropylene film selected from the group consisting of cast polypropylene film and oriented polypropylene film.

3. Composites of plastic films according to claim 2 wherein the layers a) and $a_o$) each represent a polyester film of thickness 10 to 15 $\mu$m.

4. Composites of plastic films according to claim 2 in which the layer c) has a thickness of 25 to 150 $\mu$m.

5. Composites of plastic films according to claim 1 in the form selected from the packaging group consisting of sealed seam pouches, tube-shaped pouches, self-standing pouch forms of packaging, sachets, wraps, sacks and bags.

6. Composites of plastic films according to claim 1, in which the oxygen-barrier property, measured in ($cm^3/(m^2 \times day \times bar)$), is smaller than 1.8, measured in accordance with ASTM D 3985-81 at 25 deg. C. and 50% relative humidity.

7. Composites according to claim 6 wherein the oxygen-barrier property is smaller than 0.6.

8. Composites according to claim 7 wherein the oxygen-barrier property is smaller than 0.3.

9. Composites of plastic films according to claim 1, in which the water vapor-barrier property in ($g/m^2 \times day$), measured in accordance with ASTM F 372-78 at 25 deg. C. and 90% rel. humidity is less than 0.6.

10. Composites according to claim 9 wherein the water vapor-barrier property is less than 0.4.

11. Composites of plastic films according to claim 1, in which the oxygen-barrier property, measured in ($cm^3/(m^2 \times day \times bar)$) at 25 deg. C. and 50% rel. humidity, after subjection to sterilization conditions, is less than 2.0.

12. Composites according to claim 11 wherein the oxygen barrier property is less than 0.8.

13. Composites of plastic films according to claim 1 in which the water vapor-barrier property in ($g/m^2 \times day$), measured at 25 deg. C. and 90% rel. humidity, after subjection to sterilization conditions, is less than 1.0.

14. Composites according to claim 13 wherein the water vapor-barrier property is less than 0.9.

* * * * *